United States Patent [19]

Burgdorf et al.

[11] Patent Number: 4,482,190
[45] Date of Patent: Nov. 13, 1984

[54] MULTIPLE-CIRCUIT HYDRAULIC BRAKE SYSTEM

[75] Inventors: Jochen Burgdorf, Offenbach-Rumpenheim; Alfred Birkenbach, Hattersheim, both of Fed. Rep. of Germany

[73] Assignee: ITT Industries, Inc., New York, N.Y.

[21] Appl. No.: 419,882

[22] Filed: Sep. 20, 1982

[30] Foreign Application Priority Data

Dec. 18, 1981 [DE] Fed. Rep. of Germany ....... 3150218

[51] Int. Cl.$^3$ .......................... B60T 8/02; B60T 11/24
[52] U.S. Cl. ..................................... 303/6 R; 188/345; 303/114; 303/119
[58] Field of Search ............. 303/6 R, 6 A, 6 C, 6 M, 303/111, 113–119, 61–63, 68–69, 92, 84; 188/345, 355–360, 152, 181, 106

[56] References Cited

U.S. PATENT DOCUMENTS

| 3,502,181 | 3/1970 | Lepelletier | 188/345 |
| 3,800,538 | 11/1974 | Jones | 188/345 |
| 3,976,171 | 8/1976 | Belart | 188/345 |
| 3,979,153 | 9/1976 | Ingram et al. | 188/345 |

FOREIGN PATENT DOCUMENTS

| 2213944 | 11/1972 | Fed. Rep. of Germany . |
| 2446322 | 5/1975 | Fed. Rep. of Germany . |
| 2451441 | 5/1976 | Fed. Rep. of Germany ...... 188/345 |
| 2908480 | 10/1980 | Fed. Rep. of Germany . |
| 1472046 | 6/1965 | France . |
| 2008701 | 6/1979 | United Kingdom . |
| 2036903 | 7/1980 | United Kingdom . |

OTHER PUBLICATIONS

Pages 98–99 of Ate Brake Handbook, 2nd Edition, 1981, Printed by Bartsch Verlag Kommanditgesellschaft.

*Primary Examiner*—Douglas C. Butler
*Attorney, Agent, or Firm*—James B. Raden; Marvin M. Chaban

[57] ABSTRACT

The multiple-circuit hydraulic brake system includes a brake-actuating device having three working chambers for actuating wheel brake cylinders. A first brake circuit is connected to a first of the three working chambers and separately to each wheel brake cylinder of the rear axle through a different one of two control valves controlled by the pressure of a second and a third of the three working chambers. A second brake circuit is connected between one of the wheel brake cylinders of the front axle and the second of the three working chambers and a third brake circuit is connected between the other of the wheel brake cylinders of the front axle and the third of the three working chambers. Upon failure of the second and/or third brake circuit, the associated one of the two control valves retain the pressure of the diagonally opposite rear axle wheel brake cylinder below the wheel locking limit.

27 Claims, 3 Drawing Figures

MULTIPLE-CIRCUIT HYDRAULIC BRAKE SYSTEM

BACKGROUND OF THE INVENTION

The present invention relates to a multiple-circuit hydraulic brake system, in particular for automotive vehicles, comprising a brake-actuating device for the actuation of wheel brake cylinders which contains three working chambers adapted to be pressurized, a first brake circuit connected to the first working chamber leading to wheel brake cylinders of the rear axle, and second and third brake circuits to connect wheel brake cylinders of the front axle to the second and the third working chamber of the brake-actuating device.

Such a brake system is known from German Pat. DE-OS No. 2,213,944. The known brake system comprises as a brake-actuating device a so-called three-chamber master cylinder, wherein a first piston is displaceable by means of a brake pedal and two other pistons are guided in a cylinder bore hydraulically coupled to the first piston. Thus, the brake-actuating device includes three working chambers, with a first brake circuit leading from a first working chamber to the wheel brake cylinders of the rear axle through the intermediary of a brake-force control valve.

Two wheel brake cylinders are provided at each wheel of the front axle. The front-axle wheel brake cylinders are connected to the second and the third working chamber of the brake-actuating device, respectively, such that simultaneously one wheel brake cylinder of each front wheel is in communication with one working chamber of the brake-actuating device.

Such an arrangement safeguards the occurrence of an even braking of the vehicle in the event of failure of a circuit. If, for instance, the first brake circuit pertaining to the rear axle fails, the dimensioning of the brake system ensures that the vehicle comes to a standstill by actuation of the wheel brake cylinders of the front axle alone, while a yawing moment is avoided. It is furthermore guaranteed by the brake-circuit split-up chosen that the vehicle can be braked with minimum deceleration while having the same brake effect on both vehicle sides.

A disadvantage of the prior art system described is that two wheel brake cylinders are required at each wheel of the front axle which makes the system as a whole more expensive. In addition, the length of the brake lines increases in comparison with conventional systems having a so-called Y-split-up, in which a first brake circuit serves to actuate the wheel brake cylinders of the rear axle while through second and third brake circuits exclusively one wheel brake cylinder at one front wheel, respectively, is actuated. Furthermore, it may happen in the event of a defect or of failure of the brake-force control valve at the rear axle or under extreme load conditions of the vehicle that the wheels of the rear axle will be overbraked, which would result in the vehicle becoming uncontrollable at once.

SUMMARY OF THE INVENTION

It is therefore an object of the present invention to provide a multiple-circuit hydraulic brake system of the type initially referred to which necessitates no elaborate construction and which reliably prevents a simultaneous over-braking of both rear wheels, thereby considerably increasing the directional control of the vehicle.

A feature of the present invention is the provision of a multiple-circuit hydraulic brake system for an automotive vehicle comprising a brake-actuating device for the actuation of wheel brake cylinders including three working chambers adapted to be pressurized; a first brake circuit coupled to a first of the three working chambers; a second brake circuit coupled between a second of the three working chambers and one wheel brake cylinder of a front axle of the vehicle; a third brake circuit coupled between a third of the three working chambers and the other wheel brake cylinder of the front axle; a first control valve coupled in the first brake circuit between the first of the three working chambers and one wheel brake cylinder of a rear axle of the vehicle diagonally opposite the one wheel brake cylinder of the front axle, the first control valve being coupled to the second of the three working chambers and under control of pressure therein to retain pressure in the one wheel brake cylinder of the rear axle below a wheel locking limit upon failure of the second brake circuit; and a second control valve coupled in the first brake circuit between the first of the three working chambers and the other wheel brake cylinder of the rear axle diagonally opposite the other wheel brake cylinder of the front axle, the second control valve being coupled to the third of the three working chambers and under control of pressure therein to retain pressure in the other wheel brake cylinder of the rear axle below the wheel locking limit upon failure of the third brake circuit. It is ensured by such a construction that upon failure of a front-wheel brake circuit beside the wheel brake that failed, also the pressure in the diagonally opposite wheel brake will be reduced to such an amount that no wheel lock can occur. The rear axle of the vehicle will thus be prevented from breaking away in such emergencies, since even in the case of panic stops, beside a blocked rear wheel the other rear wheel will always remain below the wheel locking limit and provide for a sufficient lateral control.

In an improvement upon the present invention, the first working chamber of the brake-actuating device is the pressure chamber of a hydraulic power booster. Such brake current split-ups have proved to be advantageous in particular in antiskid control apparatuses, wherein the brake pressures in the wheel brake cylinders of the rear axle are modulated synchronously while it is renounced to control the wheels at the rear axle individually. Hence, the actuation of the rear wheel brakes is effected dynamically, while the second and third brake circuits are adapted to be pressurized by a multi-chamber master cylinder statically. Applicable as multiple-chamber master cylinders are either tandem master cylinders in which the master-cylinder pistons are arranged in series, or dual-circuit master cylinders in which the master-cylinder pistons are arranged in parallel one to the other.

Each control valve of the inventive brake system is expediently of such construction that there is arranged a first valve passage by means of which that portion of the first brake circuit can be closed that is close to the working chamber. It may occur by all means in the event of a defect in one front-wheel brake circuit that the dynamic brake circuit remains in operation. It will therefore be ensured by closure of the portion close to the working chamber that the pressure fluid supplied to the pressure chamber of the brake booster will not exhaust through the control valve into the defect brake circuit. Apart therefrom, each control valve contains a second valve passage by which portions of the first brake circuit may be relieved of pressure which are close to the wheel cylinder. It will result thereby that, upon failure of one front-wheel brake circuit, the pressure of the diagonally opposite portion of the first brake circuit close to the wheel cylinder will be reduced to a degree such as to reliably avoid a wheel lock. Suitably, a chamber is located between the first and the second valve passage which is in communication with the wheel brake cylinder.

In a favorable improvement of the control valve, the first valve passage is governed by a closure member which is acted upon by the pressure of the first working chamber in the closing direction and by the pressure of a further working chamber in the opening direction. In addition, this closure member is acted upon by the force of a compression spring in the opening direction. It will be ensured by this arrangement that in fail-free operation of the brake system the valve passages between the first working chamber and the wheel brake cylinders of the rear axle will always be opened to enable a brake application to take place in due order. Not until the corresponding pressure of the second or the third working chamber ceases will the pressure force of the dynamic rear-axle circuit exerted on the closure member prevail, whereby the closure member is moved to assume its closing position. In doing so, the force of the compression spring acting in the opening direction will be overcome easily. It will be furthermore suitable to have the second valve passage adapted to be opened towards a working chamber exclusively from that chamber to which the portion, close to the wheel cylinder, of the first brake circuit is connected. This non-return function may be taken care of in a simple manner by a sleeve seal. Alternatively, said chamber may communicate with a working chamber via an external check valve opening towards the working chamber.

The inventive brake system can be combined with antiskid control apparatus in an expedient manner, if valve means serving for the pressure modulation in the first brake circuit are inserted into the connection between the control valves and the first working chamber of the brake-actuating device, and if valve means for the pressure modulation are connected upstream to each wheel brake cylinder of the front axle. These valve means are controllable individually in a favorable way by antiskid control electronics so that the pressure modulation in the three brake circuits is controllable independently of one another in dependence upon the instantaneous rotational behavior of the wheel.

A straightforward construction will be achieved when accommodating the control valves jointly in one housing. Both control valves can be handled as one constructional unit in this case. In such a constructional unit, the closure members will be preferably located coaxially in the housing, the opening movement of the closure members being limited by one common axial stop. Besides, it will be an advantage to preload the closure member of the first valve passage in the closing direction and to normally retain it in the opened position by means of a stepped piston. In this instance, the larger end face of the stepped piston is exposed to the pressure of the diagonally opposite front-wheel brake cylinder, while the smaller end face of the stepped piston is acted upon by the pressure of the corresponding rear-wheel brake cylinder in the sense of a closing of the first valve passage. To guarantee a permanent communication between the first working chamber and the wheel brake cylinders of the rear axle also in the non-activated state of the brake system, the larger end face of the stepped piston is loaded by a compression spring in addition. Expediently, the forces of the compression springs are coordinated such that the force of the compression spring loading the stepped piston is higher than the preloading force of the closure member.

If the smaller end face of the stepped piston defines a chamber communicating with a rear-wheel brake cylinder and having a volume variable by the position of the stepped piston, the pressure in the rear-wheel brake circuit can be adapted to the pressure prevailing in the front-wheel brake cylinder particularly easily and with respect to quantity. The position of the stepped piston will be governed by the pressure in the front-wheel brake cylinder. To increase the functional reliability of the control valve, the end faces of the stepped piston are hydraulically interconnected via a check valve which will open when there is a pressure gradient towards the front-wheel brake cylinder. A pressure relief of the rear-wheel brake circuit will thus be ensured also in this case, when the piston movement does not suffice to cause the required pressure decrease in the wheel cylinder.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
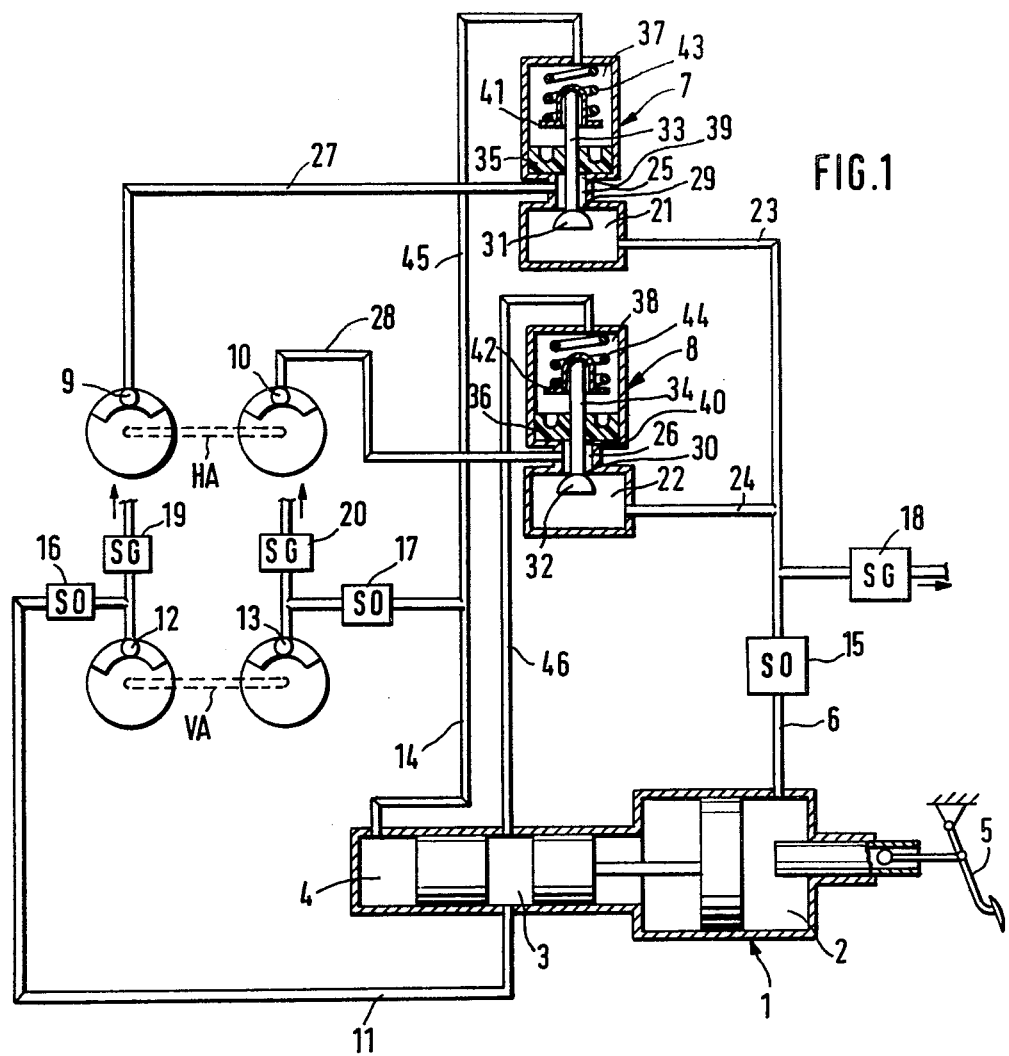
FIG. 1 is a schematic illustration of a brake system in accordance with the principles of the present invention incorporating two separately constructed control valves.

Corresponding parts have been assigned like reference numerals in the three Figures.

In FIG. 1, reference numeral 1 designates a brake-actuating device which is constructed as a hydraulic power booster with a tandem master cylinder connected downstream thereof. Brake-actuating device 1 contains three working chambers 2, 3 and 4, the working chamber 2 being formed by the pressure chamber of the brake booster which latter chamber is connectible to a pressure source or relievable from pressure, respectively, depending upon the force applied to a brake pedal 5.

Extending from the first working chamber 2, a first brake circuit 6 leads through the intermediary of two control valves 7 and 8 to the wheel brake cylinders 9 and 10 of the rear axle of an automotive vehicle. The second working chamber 3 of the brake-actuating device 1 is in communication with a wheel brake cylinder 12 of the front axle via a second brake circuit 11, while the other wheel brake cylinder 13 of the front axle communicates via a third brake circuit 14 with the third working chamber 4 of the brake-actuating device. Inserted into the brake circuits 6, 11 and 14 are electromagnetically actuatable valves 15, 16 and 17 which are open in the de-energized state. Connected downstream of these valves 15, 16 and 17 are further electromagnetically actuatable valves 18, 19 and 20 which are closed in their de-energized state and which, when energized, will provide for communication between the wheel brake cylinders 9, 10, 12, 13 and a non-illustrated unpressurized return reservoir.

The control valves 7 and 8 are of identical construction and comprise substantially an inlet chamber 21, 22 which is in communication with the portion 23, 24 of the first brake circuit 6, which portion is close to working chamber 1. Adjacent to inlet chamber 21, 22 is a chamber 25, 26 connected to the portion 27, 28 of the first brake circuit 6, which portion is close to the wheel cylinder. Provided between the inlet chamber 21, 22 and the chamber 25, 26 is a first valve passage 29, 30 which enables the portions 27, 23 and 28, 24, respectively, of the first brake circuit 6 to be shut off with respect to one another dependent upon the position of a closure member 31, 32.

On its side remote from inlet chamber 21, 22, closure member 31, 32 is provided with a tappet 33, 34 which extends through chamber 25, 26 and projects through a sleeve seal 35, 36 into a control chamber 37, 38 of the control valve 7, 8. Sleeve seal 35, 36 forms a second valve passage 39, 40 between the chamber 25, 26 and the control chamber 37, 38. In addition to this, the sleeve seal 35, 36 performs a non-return function, e.g. the second valve passage 39, 40 will only be opened in the event of a pressure gradient prevailing from the chamber 25, 26 to the control chamber 37, 38.

The end of tappet 33, 34 remote from the closure member 31, 32 is provided with a spring plate 41, 42 at which a compression spring 43, 44 engages in a manner such as to load closure member 31, 32 in the opening direction of the first valve passage 29, 30. The control chamber 37 of the control valve 7 is connected with the third working chamber 4 of the brake-actuating device 1 via a pressure line 45. A pressure line 46 serves as a connection between the control chamber 38 of the control valve 8 and the second working chamber 3 of the brake-actuating device 1.

The mode of operation of the brake system described will be explained hereinbelow, the starting point being the state of the brake's release in which no force is applied to the brake pedal 5 and all three brake circuits 6, 11 and 14 are unpressurized. It is furthermore presupposed that the valves 15, 16 and 17 which are open in the de-energized state and the valves 18, 19 and 20 which are closed in the de-energized state will be in their inactive position. The first valve passages 29 and 30 of the control valves 7 and 8 will be opened under these conditions, since compression springs 43 and 44 exerts corresponding opening forces on closure members 31 and 32. Upon application of brake pedal 5, auxiliary hydraulic pressure will be metered into working chamber 2 via a brake valve of the brake booster of brake-actuating device 1. The pressure force in working chamber 2 causes a static pressure to develop in working chambers 3 and 4 which propagates through the second and third brake circuits 11 and 14 as well as the valves 16 and 17 which are opened in the de-energized state to the wheel brake cylinders 12 and 13 of the front axle. At the same time, the pressure in the working chambers 3 and 4 of brake-actuating device 1 propagates through the pressure lines 45 and 46 to control chambers 37 and 38 of control valves 7 and 8. This pressure now prevailing in control chambers 37 and 38 exerts another force on closure members 31 and 32 in the opening direction. It is essential in this arrangement, that control chamber 37 of control valve 7 is supplied with the pressure of third brake circuit 14, while control chamber 38 of control valve 8 is connected to working chamber 3 of brake-actuating device 1 which latter chamber pressurizes second brake circuit 11. It will result by such a connection that control valve 7 which is associated with wheel brake cylinder 9 of the rear axle is governed by the pressure of the diagonally opposite wheel brake cylinder 13 of the front axle. On the other hand, control valve 8 is assigned to wheel brake cylinder 10 of the rear axle and is governed by the pressure of the diagonally opposite wheel brake cylinder 12 of the front axle or the second brake circuit 11.

The pressure in first working chamber 2 of the brake-actuating device 1 propagates via valve 15 which is opened in the de-energized state, the line portions 23, 27 and 24, 28 of the first brake circuit 6 to wheel brake cylinders 9 and 10, respectively, of the rear axle. Now also inlet chambers 21 and 22 of the control valves 7 and 8 are pressurized. This pressure exerts a force component effective in the closing direction on closure members 31 and 32. In spite of this pressurization, however, the first valve passages 29 and 30 will remain opened by the action of compression springs 43 and 44 as long as the brake system is in full operation.

It shall be assumed in the following that there is a defect in the second brake circuit 11. The second working chamber 3 of brake-actuating device 1 becomes unpressurized so that no braking effect takes place at the vehicle wheel associated with wheel brake cylinder 12. Simultaneously, also control chamber 38 becomes unpressurized which is connected to the second working chamber 3 of brake-actuating device 1 via pressure line 46. The dynamic braking pressure of the first brake circuit 6 prevailing in inlet chamber 22 now causes closure member 32 to move in opposition to the force of compression spring 44 in the closing direction until valve passage 30 between inlet chamber 22 and chamber 26 is closed. The portions 24 and 28 of the first brake circuit 6 will be separated from each other in this working condition. Moreover, a pressure gradient prevails now from chamber 26 to control chamber 38 and as a result thereof valve passage 40 opens and permits pressure fluid to flow from portion 28 of the first brake circuit 6, portion 28 being close to wheel cylinder 10 into control chamber 38. The pressure in wheel brake cylinder 10 of the rear axle and the pressure in portion 28 close to wheel cylinder 10 will be decreased. To this end, sleeve seal 36 is dimensioned such that the pressure in wheel brake cylinder 10 will be maintained below the wheel locking limit.

Hence, during pressure failure in the second brake circuit 11 and in the inactivated state of wheel brake cylinder 12, the diagonally opposite wheel brake cylinder 10 of the rear axle will be put out of operation at the same time. If a panic stop is initiated during such a failure, it is safeguarded that there will be no overbraking of the two rear wheels. Besides, the brake torques will be distributed relatively evenly with relation to the vertical axis of the vehicle, thereby avoiding a yawing or an askew motion of the vehicle.

The brake system described operates in a similar manner upon the occurrence of a defect in the third brake circuit 14. In this instance, beside the wheel brake cylinder 13 of the front axle being unpressurized, also the diagonally opposite wheel brake cylinder 9 of the rear axle becomes unpressurized or will be acted upon by a comparatively low residual pressure exclusively.

Figure 2:
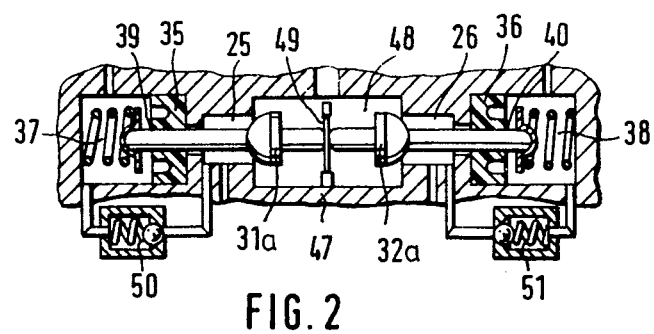
FIG. 2 is a longitudinal cross sectional view of a first embodiment of the two control valves in a common housing.

In FIG. 2, control valves 7 and 8 of FIG. 1 are combined to form a constructional unit and are accommodated in one single housing 47. The two control valves 7 and 8 are unitized in such a fashion that the closure members 31a and 32a project into one common inlet chamber 48 and in the inactive position are in abutment with an axial stop 49 there. The control valve is of mirrow-symmetrical construction in relation to stop 49. Otherwise, the two symmetrical halves correspond exactly to the separately constructed control valves 7 and 8 of FIG. 1 so that detailed operational descriptions may be dispensed with. The control valve of FIG. 2 contains additionally two check valves 50 and 51 which are connected in parallel to the second valve passages 39,40. This arrangement permits the pressure in the rear-wheel brake cylinder 9 and 10 to adapt to a larger degree to the pressure of the respective opposite wheel brake cylinder 12 and 13 of the front axle, since check valves 50 and 51 assume their open position in the event of minor pressure differences at the second valve passage 39 and 40. A residual pressure in the rear-wheel brake cylinder 9 and 10, which would have been maintained otherwise by the sleeve seal 35 and 36, is thereby able to decrease.

Figure 3:
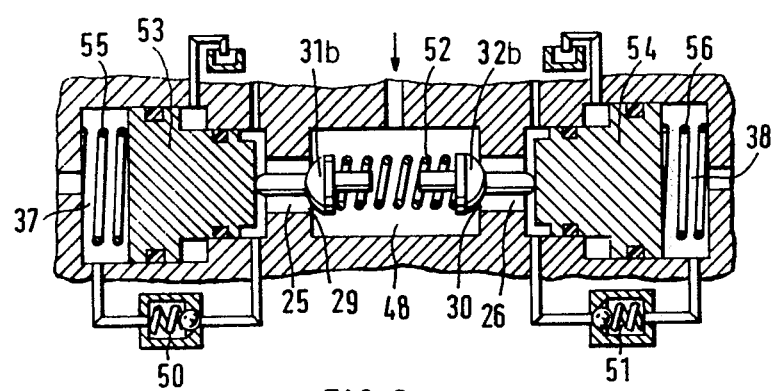
FIG. 3 is a longitudinal cross sectional view of a second embodiment of the two control valves in a common housing.

FIG. 3 shows another unitized control valve having one common inlet chamber 48 which receives the pressure of the first brake circuit 6 and which houses two closure members 31b and 32b preloaded by one common compression spring 52. During normal braking operations as well as in the state of brake release, closure members 31b and 32b are held in position relative to one another by stepped pistons 53 and 54 such that the first valve passages 29 and 30 are opened. To this end, the larger end faces of stepped pistons 53 and 54 are acted upon by the force of compression springs 55 and 56, the force of compression springs 55 and 56 being higher than the force of compression spring 52. Furthermore, the larger end faces of stepped pistons 53 and 54 define in turn control chambers 37 and 38 which are supplied with the pressure of the second brake circuit 11 and the third brake circuit 14, respectively. Interposed between the chambers 25, 26 and 37, 38 are check valves 50 and 51 which can open towards the control chambers 37 and 38, respectively.

When front-wheel brake circuits 11 and 14 operate fail-free, there is established an unhindered passage via the first valve passages 29 and 30 to the wheel brake cylinders 9 and 10 of the rear axle. As soon as one of the second and third brake circuits 11 and 14 fails, the pressure force acting on the larger end faces of the stepped piston 53 or 54 ceases to exist so that the pressure prevailing in chamber 25 or 26 displaces stepped piston 53 or 54 in opposition to the force of compression spring 55 or 56 which causes closure of the corresponding valve passage 29 or 30. Further displacement of stepped piston 53 or 54 initiates an increase in volume and a corresponding pressure drop in portion 27 or 28 of the first brake circuit that is close to the wheel cylinder. The pressure drop is then of an amount such as to reliably retain the vehicle wheel assigned to the respective rear-wheel brake cylinder 9 or 10 below the wheel locking limit. When check valves 50 and 51, known from the control valve of FIG. 2, are inserted between chambers 25 and 37, and chambers 26 and 38, a further pressure decrease will be enabled in portions 27 or 28 of the first brake circuit 6 that are close to the wheel cylinder.

While we have described above the principles of our invention in connection with specific apparatus, it is to be clearly understood that this description is made only by way of example and not as a limitation to the scope of our invention as set forth in the objects thereof and in the accompanying claims.

We claim:

1. A multiple-circuit hydraulic brake booster system for an automotive vehicle comprising:
   a brake-actuating device for the actuation of wheel brake cylinders including three working chambers adapted to be pressurized;
   a first brake circuit coupled to a first of said three working chambers;
   a second brake circuit coupled between a second of said three working chambers and one wheel brake cylinder of a front axle of said vehicle;
   a third brake circuit coupled between a third of said three working chambers and the other wheel brake cylinder of said front axle;
   a first control valve coupled in said first brake circuit between said first of said three working chambers and one wheel brake cylinder of a rear axle of said vehicle diagonally opposite said one wheel brake cylinder of said front axle, said first control valve being coupled to said second of said three working chambers and under control of pressure therein to retain pressure in said one wheel brake cylinder of said rear axle below a wheel locking limit upon failure of said second brake circuit; and
   a second control valve coupled in said first brake circuit between said first of said three working chambers and the other wheel brake cylinder of said rear axle diagonally opposite said other wheel brake cylinder of said front axle, said second control valve being coupled to said third of said three working chambers and under control of pressure therein to retain pressure in said other wheel brake cylinder of said rear axle below said wheel locking limit upon failure of said third brake circuit.

2. A brake system according to claim 1, wherein said first of said three working chambers is a pressure chamber of a hydraulic brake booster.

3. A brake system according to claim 2, wherein said second and third brake circuits are coupled to different chambers of a multiple-chamber master cylinder and acted upon by static pressure in said different chambers.

4. A brake system according to claim 3, wherein said multiple-chamber master cylinder is a tandem master cylinder mechanically controlled by said brake booster.

5. A brake system according to claim 3, wherein said multiple-chamber master cylinder is a dual circuit master cylinder mechanically controlled by said brake booster.

6. A brake system according to claim 1, wherein each of said first and second control valves includes a first valve passage adjacent said first of said three working chambers to enable closing a first portion of said first brake circuit adjacent said first of said three working chambers.

7. A brake system according to claim 6, wherein each of said first and second control valves further includes a second valve passage adjacent an associated one of said one and said other wheel brake cylinder of said rear axle to enable relieving pressure in a second portion of said first brake circuit adjacent an associated one of said one and said other wheel brake cylinder of said rear axle.

8. A brake system according to claim 7, wherein each of said first and second control valves further includes a chamber disposed between said first and second valve passages connected to an associated one of said one and said other wheel brake cylinder of said rear axle.

9. A brake system according to claim 8, wherein each of said first and second control valves further includes a closure member to control the opening and closing of said first valve passage, said closure member being acted upon by pressure of said first of said three working chambers in a closing direction and by pressure of an associated one of said second and third of said three working chambers in an opening direction.

10. A brake system according to claim 9, wherein each of said first and second control valves further includes a compression spring acting upon an associated one of said closure members in said opening direction.

11. A brake system according to claim 7, wherein each of said first and second control valves further includes a closure member to control the opening and closing of said first valve passage, said closure member being acted upon by pressure of said first of said three working chambers in a closing direction and by pressure of an associated one of said second and third of said three working chambers in an opening direction.

12. A brake system according to claim 11, wherein each of said first and second control valves further includes a compression spring acting upon an associated one of said closure members in said opening direction.

13. A brake system according to claim 6, wherein each of said first and second control valves further includes a closure member to control the opening and closing of said first valve passage, said closure member being acted upon by pressure of said first of said three working chambers in a closing direction and by pressure of an associated one of said second and third of said three working chambers in an opening direction.

14. A brake system according to claim 13, wherein each of said first and second control valves further includes a compression spring acting upon an associated one of said closure members in said opening direction.

15. A brake system according to claims 9 or 10, wherein
each of said second valve passages is adapted to be opened exclusively from an associated one of said chambers to an associated one of said second and said third of said third of said three working chambers.

16. A brake system according to claim 15, wherein each of said second valve passages is controlled by a sleeve seal having a non-return function.

17. A brake system according to claim 15, wherein each of said chambers is connected to an associated one of said second and third of said three working chambers by a check valve opening toward said associated one of said second and third of said three working chambers.

18. A brake system according to claim 1, further including
first valve means connected between said first of said three working chambers and said first and second control valves to pressure modulate said first brake circuit;
second valve means connected between said second of said three working chambers and said one wheel brake cylinder of said front axle to pressure modulate said second brake circuit; and
third valve means connected between said third of said three working chambers and said other wheel brake cylinder of said front axle to pressure modulate said third brake circuit.

19. A brake system according to claim 18, wherein said first, second and third valve means are individually controlled by an antiskid control circuit.

20. A brake system according to claim 1, wherein said first and second control valves are disposed in a common housing.

21. A brake system according to claims 9, 11 or 13, wherein
said first and second control valves are disposed in a common housing.

22. A brake system according to claim 21, wherein each of said closure members is disposed in an end to end coaxial relationship in said common housing, said opening movement of each of said closure members being limited by a common axial stop disposed in said common housing.

23. A brake system according to claim 21, wherein each of said closure members is preloaded in a closing direction and is normally kept in its open position by a stepped piston having its larger end surface exposed to pressure of an associated one of said second and third of said three working chambers and its smaller end surface acted upon by pressure of an associated one of said one and said other wheel brake cylinder of said rear axle in said closing direction.

24. A brake system according to claim 23, further including
two compression springs each acting upon said larger end surface of a different one of said stepped pistons.

25. A brake system according to claim 24, wherein the force of each of said two compression springs is greater than the preloading force of an associated one of said closure members.

26. A brake system according to claim 23, wherein said smaller end surface of each of said stepped pistons defines a chamber in communication with an associated one of said one and said other wheel brake cylinders of said rear axle whose volume is variable dependent upon the position of an associated one of said stepped pistons.

27. A brake system according to claim 23, further including
two check valves each associated with a different one of said stepped pistons to hydraulically connect said larger and said smaller end surfaces thereof, each of said two check valves opening when there is a pressure gradient from said wheel brake cylinders of said rear axle to said wheel brake cylinders of said front axle.

* * * * *